US011333782B2

(12) United States Patent
Wang

(10) Patent No.: US 11,333,782 B2
(45) Date of Patent: May 17, 2022

(54) COMPUTER-IMPLEMENTED METHOD AND SYSTEM FOR REMOVING LOW FREQUENCY AND LOW WAVENUMBER NOISES TO GENERATE AN ENHANCED IMAGE

(71) Applicants: China Petroleum & Chemical Corporation, Beijing (CN); Sinopec Tech Houston, Houston, TX (US)

(72) Inventor: Yongzhong Wang, Houston, TX (US)

(73) Assignee: China Petroleum & Chemical Corporation, Beijing (CN)

( * ) Notice: Subject to any disclaimer, the term of this patent is extended or adjusted under 35 U.S.C. 154(b) by 0 days.

(21) Appl. No.: 16/917,571

(22) Filed: Jun. 30, 2020

(65) Prior Publication Data

US 2021/0405236 A1 Dec. 30, 2021

(51) Int. Cl.
*G01V 1/36* (2006.01)
(52) U.S. Cl.
CPC .............. *G01V 1/364* (2013.01); *G01V 1/362* (2013.01); *G01V 2210/32* (2013.01)
(58) Field of Classification Search
None
See application file for complete search history.

(56) References Cited

U.S. PATENT DOCUMENTS

| 8,619,498 | B2 | 12/2013 | Xu | |
|---|---|---|---|---|
| 9,128,205 | B2* | 9/2015 | Guan | G01V 1/301 |
| 9,829,592 | B2 | 11/2017 | Ramos-Martinez | |
| 10,078,593 | B2 | 9/2018 | Shalf | |
| 10,281,604 | B2 | 5/2019 | Jing | |
| 2010/0088035 | A1* | 4/2010 | Etgen | G01V 1/30 702/16 |
| 2012/0075954 | A1* | 3/2012 | Xu | G01V 1/36 367/38 |
| 2015/0276956 | A1* | 10/2015 | Khalil | G01V 1/28 702/16 |
| 2016/0334527 | A1* | 11/2016 | Xu | G01V 1/30 |

(Continued)

OTHER PUBLICATIONS

D. E. Lumley, J. F. Claerbout, D. Bevc, Anti-aliased Kirchhoff 3-D migration, Stanford Exploration Project, Report 80, May 15, 2001, pp. 1-144.

(Continued)

*Primary Examiner* — Lina M Cordero
(74) *Attorney, Agent, or Firm* — Novick, Kim & Lee, PLLC; Allen Xue

(57) ABSTRACT

A method and a system for implementing the method are disclosed wherein the source wavelet, input parameter models, and seismic input data may be obtained from a non-flat surface, sometimes mild, or foothill topography as well as the shot and receiver lines might not necessarily be straight, and often curve to avoid obstacles on the land surface. In particular, the method and system disclosed, suppresses low wavenumber and low frequency noises, by balancing lateral and vertical amplitudes to produce an image of subsurface reflectors located within a survey area having higher lateral resolutions and wavenumbers, as well as higher high-cut frequencies, and lower low-cut frequencies in complex media, than could otherwise not be achieved by other methods commonly known in the art.

9 Claims, 5 Drawing Sheets

(56) References Cited

U.S. PATENT DOCUMENTS

2016/0341837 A1* 11/2016 Jing ...................... G01V 1/364

OTHER PUBLICATIONS

Anders Tjulin, Jean-Louis Pinc, Fouad Sahraoui, Mats Andre, Nicole Cornilleau-Wehrlin, The k-filtering technique applied to wave electric and magnetic field measurements from the Cluster satellites, Journal of Geophysical Research, vol. 110, A11224, doi:10.1029/2005JA011125, 2005.
Yu Zhang, James Sun, Practical issues in reverse time migration: true amplitude gathers, noise removal and harmonic source encoding, first break vol. 26, Jan. 2009.
R. Baina, S. Nguyen, M. Noble, G. Lambare, Optimal anti-aliasing for ray-based kirchhoff depth migration, Jan. 1999, Published in print: Jan. 1, 2003, SEG Technical Program Expanded, pp. 1130-1133.

* cited by examiner

COMPUTER-IMPLEMENTED METHOD AND SYSTEM FOR REMOVING LOW FREQUENCY AND LOW WAVENUMBER NOISES TO GENERATE AN ENHANCED IMAGE

TECHNICAL FIELD

The present disclosure generally relates to imaging complex subsurface structures, by mapping input seismic trace data through a migration operator to the output structural image, in particular using a 3D Laplacian operator in combination with 2D filtering techniques, for removing low frequency and low wavenumber noises thereby illuminating and interpreting subsurface hydro-carbonate targets for post seismic processing.

BACKGROUND OF INVENTION

1. Overview

It is known by persons of ordinary skill in the art, that lithology identification and fluid discrimination play an important role in seismic exploration and reservoir characterization. The definition of lithology identification and fluid discrimination, has been estimated by using a weighted stack method from prestack seismic data, and was first introduced by Smith, G. and Gidlow, P., during their research of *Weighted stacking for rock property estimation and detection of gas: Geophysical Prospecting* (1987). Later on, Goodway, B., T. Chen, and J. Downton, introduced *Improved AVO fluid detection and lithology discrimination using Lamé petrophysical parameters: "$\lambda\rho$", "$\mu\rho$". & "$\lambda/\mu$ fluid stack" from P and S inversions at the 67th Annual International Meeting*, SEG, founding that Lamé parameters were sensitive to hydrocarbon saturation compared to elastic parameters and proposed a lambda-mu-rho (LMR) method for lithology identification and fluid discrimination. It was later discovered that this method was subject to change, depending upon the depth of burial, compaction and overburden pressure, and as such, had some limitations on practical reservoirs with porous media. In 2006, Quakenbush, M., B. Shang, and C. Tuttle, introduced the concept of Poisson impedance, as applied to lithology identification and fluid discrimination. In fact, in their research paper *Poisson impedance: The Leading Edge*, v. 25, no. 2, pp. 128-138, which was considered a relatively novel attribute, a sensitivity tool was first developed of said method for discriminating lithology and fluid content. This kickstarted the era of developing computer-implemented methods for obtaining fluid attributes, performing fluid discrimination but did not include hydrocarbon predictions. As such, on or around 1980s, reverse time migration quickly became the high-end imaging method of choice in complex geology (See for instance, Baysal, E., D. D. Kosloff, and J. W. C. Sherwood, 1983, *Reverse time migration: Geophysics*, vol. 48, pp. 1514-1524; and Etgen, J., 1986, *Prestack reverse time migration of shot profiles: SEP-Report*, vol. 50, pp. 151-170).

However, one of the computational challenges of RTM is that the source wavefield is propagated forward in time (from 0 to t-time max) while the receiver wavefield is propagated backwards in time (from t-time max to 0), yet the imaging step requires these two fields to be correlated at each time t. It was soon discovered that storing one of the wavefields in a central processing unit, or a graphics processing unit-memory resource turned out impractical for 3-D problems. The most obvious solution then became the storing of wavefield at each imaging step on a physical disk, such as a hard disk. This in turn required, significant disk storage on each node and caused the problem to quickly become Input/Output (IO) bound. To solve this problem, it was proposed a checkpointing scheme, where a smaller number of snapshots were stored to hard drive and intermediate wavefields regenerated (See Symes, W. W., 2007, *Reverse time migration with optimal checkpointing: Geophysics*, vol. 72, pp. SM213-SM221). Another proposed approach, was to save the wavefield at boundaries of the computational domain and to re-inject them (See Dussaud, E., W. W. Symes, L. Lemaistre, P. Singer, B. Denel, and A. Cherrett, 2008, *Computational strategies for reverse-time migration: 78th Annual Internat. Mtg., Soc. Expl. Geophys., Expanded Abstracts*, page SPMI 3.3).

On the other hand, hydrocarbon predictions from seismic amplitude and amplitude-versus-offset still remain a difficult task. An approach is to use seismic reflections to closely relate them to subsurface rock properties. Yet, the strongest amplitude-versus-offset ("AVO") in the seismic data is often caused by hydrocarbon saturation in the rocks. Advances on the use of prestack seismic inversion for extracting information in terms of subsurface elastic parameters for seismic data have tremendously helped in characterizing lithofacies and predicting reservoir properties with minimum error thereby reducing the number of dry wells and drilling risks in some basins of the world (See e.g. Russel, B., 2014, *Prestack seismic amplitude analysis: an integrated overview: Interpretation*, v. 2, no. 2, SC19-SC36). Such prestack seismic inversion models have been routinely applied for lithology prediction and fluid detection to identify potential targets for oil and gas exploration. Most recently, it has been widely used for estimating sweet spots in unconventional shale gas applications.

The essence of the prestack seismic inversion model is in the fact that the shear modulus of a rock does not change when the fluid saturation is changed. The bulk modulus in turn, changes significantly when the fluid saturation is changed. Since the shear modulus of the rock skeleton is equivalent to the shear modulus of the rock with pore fluid, the shear impedance can then be considered as a seismic attribute that mainly connects to the rock skeleton, whereas the acoustic impedance is dominated by both pore fluid and rock skeleton. As a result, the Poisson impedance can optimally eliminate the effect of rock skeleton in shear modulus from the one in acoustic impedance, which in return can produce better resolution of the fluid content. With prestack seismic data, Poisson impedance is conventionally computed indirectly from P-wave, S-wave velocities and density which can be inverted from seismic data directly (See Goodway, supra). However, the indirect way of parameters estimation creates more uncertainties caused by the indirect calculation (See e.g. Zong, Z., X. Yin, and G. Wu, 2013, *Elastic impedance parameterization and inversion with Young's modulus and Poisson's ratio*, Geophysics, v. 78, no. 6, N35-N42). Wang, B., X. Yin, and F. Zhang, 2006, in their research paper *Lamé parameters inversion based on elastic impedance and its application: Applied Geophysics*, v. 3, pp. 120-123; compared the direct way to estimate the Lamé parameters from prestack seismic data, to the indirect way of the Lamé parameters estimation using the inverted P-wave and S-wave, but concluding that it still caused much more bias.

Thus, as a result of all these failed attempts to reduce the accumulative error, to eliminate noise, and to provide accurate and reasonable results; direct and indirect, extraction of fluid factors from prestack seismic inversion have gained much attention in recent years, especially given the wider availability and access to system computers with high performance computing systems, required to solve large scientific and engineer problems like the foregoing.

2. Reverse Time Migration Using Laplacian Operators

As it has been mentioned, reverse time migration (RTM) is an advanced seismic migration imaging method. However, when the source wavefield and the receiver wavefield are cross-correlated, the cross-correlations of direct arrivals, backscattered waves, and overturned waves will produce a low-frequency and low-wavenumber noises, which will mask the final imaging results. As such, several techniques have been proposed in the literature, such as a velocity smoothing high-pass filter (See Mulder, W. A. and Plessix, R.-E., 2003, *One-way and two-way wave equation migration*, vol. 73rd SEG Annual Meeting, pp. 881-884.), Poynting vectors (See Yoon, K., Marfurt, K. J. and Starr, W., 2004, *Challenges in reverse-time migration*, vol. 74th SEG Annual Meeting, pp. 1057-1060), and a directional damping term at the interface (See Fletcher, R. F., Fowler, P., Kitchenside, P. and Albertin, U., 2005, *Suppressing artifacts in prestack reverse time migration*, vol. 75th SEG Annual Meeting, pp. 2049-2051). In practice, these approaches were difficult to implement properly or had significant drawbacks of distorting the spectrum or amplitude of the migrated images undesirably. Later on, it was proposed (See Liu, F., Zhang, G., Morton, S. and Leveille, J., 2007, *Reverse-time migration using one-way wavefield imaging condition*, vol. 77th SEG Annual Meeting, pp. 2170-2174) a new imaging condition to address the problems mentioned by prior techniques. It generally comprised of first decomposing the wavefields into one-way components, and then only cross-correlating the wave components that occur as reflections. Nevertheless, this technique was mostly effective in 2D-space domains, as fully decomposing in 3D-space domains the wavefield was computationally intensive, as well as incorporated an incomplete decomposition resulting in inadvertently removing steeply dipping reflectors in complex structures.

As such, Laplacian filtering in 3D-space domain was introduced as a common method to suppress these low-frequency and low-wavenumber noises, in order to adapt any complex media, with the detriment of an increase in computational cost. However, what was later discovered was that simple, direct Laplacian filtering, was destroying the characteristics of the useful signals acquired from a survey region. Zhang and Sun (See Yu Zhang and James Sun; January 2009, *Practical issues in reverse time migration: true amplitude gathers, noise removal and harmonic source encoding*, First Break, volume 26, pp. 29-37) proposed an improved Laplacian filtering method and gave a simple calculation formula and explanation. This method effectively suppressed solely the low-frequency noise in reverse time migration while retaining the useful signal characteristics but lacked detailed and strict mathematical derivation.

Later on, several reverse time migration (RTM) schemes based on a viscoacoustic wave equations with fractional Laplacian operators were introduced to compensate the viscous effects. These methods, first developed a high-efficiency method for simulating wave propagation based on the viscoacoustic wave equation; then split the viscoacoustic wave equation into the amplitude attenuation and phase dispersion equations to achieve a more reasonable Q-compensated RTM algorithm; and finally tested the Q-compensated reverse time migration approach using a simple graben model and a more realistic modified Marmousi model. Yet, these methods provided compensated migration results that were still highly close to those obtained by the conventional RTM of seismic data without attenuation.

Therefore, aiming at some defects of existing technology, the present embodiments of this invention introduces a new computer-implemented method for removing low frequency and low wavenumber noises to generate an enhanced image.

3. Low-Pass Wavenumber Filtering (k-Filtering)

The k-filtering technique is a method to characterize stationary fluctuations in terms of wave or shot energy distribution in the frequency and wave vectors. Simply put, it can be thought as localizing the speed and direction of a particular signal. The design of filters for spacetime signals follows a similar approach as that of 1-D signals. The filters for 1-D signals are designed in such a way that if the requirement of the filter is to extract frequency components in a particular non-zero range of frequencies, a band-pass filter with appropriate passband and stop band frequencies is determined. Similarly, in the case of multi-dimensional systems, the wavenumber-frequency response of filters is designed in such a way that it is unity in the designed region of (k, ω) a.k.a. wavenumber-frequency and zero elsewhere. As such, low-pass wavenumber filtering has the ability to distinguish between wave modes of the same frequency even those with different wave vectors. This method is based on simultaneous multi-point measurements of the wave field components, where a filter bank is used to enhance resolution. The most prominent use of the k-filtering technique has previously been with only the magnetic field measurements.

In fact, the k-filtering technique is a multi-spacecraft method used to estimate the wave field energy distribution, P, as a function of angular frequency, ω, and wave vector, k. The basic idea of k-filtering is to apply a filter bank in the spatial domain to a data time series that is measured at several spatial locations and has been transformed into frequency domain (See Pinc on, J.-L., and U. Motschmann (1998), *Multi-spacecraft filtering: General framework*, in *Analysis Methods for Multi-Spacecraft Data*, edited by G. Paschmann and P. W. Daly, ISSI Sci. Rep., SR-001, chap. 3, pp. 65-78). This specific filter is dependent on ω and k, and it is ideally designed in such a way that it absorbs all wave field energies, except the part that is corresponding to plane waves with ω and k, which should pass the filter undisturbed.

The k-filtering technique can be considered as a method to decompose the total measured spatial correlation matrix M(ω) into a sum of correlation matrices, corresponding to pure plane wave modes.

$$M(\omega) = [A(\omega)A'(\omega)] \quad (1)$$

$$\text{where } A(\omega) = \begin{pmatrix} A(\omega, r_1) \\ A(\omega, r_2) \\ \vdots \\ A(\omega, r_N) \end{pmatrix} \text{ at the spatial point } r$$

Since M(ω) is an NL×NL matrix, it can only be decomposed into NL linearly independent correlation matrices. One of these matrices corresponds to the incoherent noise in the data, which leaves a theoretical maximum of NL−1 different wave modes that can be distinguished using the k-filtering method. By measuring more components of the wave field, a person having ordinary skills in the art, may distinguish between a larger number of wave modes. Using a larger number of receiving sensors will also help, since the number of wave modes depends on the size of the measured spatial correlation matrix. The use of constraints on the field components will on the other hand reduce the number of wave modes, since they reduce the number of independent components of the wave field. As such, the k-filtering method can suppress any aliased peaks in wave field energy distributions by convenient choosing a constraining matrix. This can be done more efficiently when more components of the wave field are measured, but it still relevant to perform certain anti-aliasing.

4. Anti-Aliasing

The process of seismic migration involves a mapping of the input seismic trace data by a migration operator to the output structural image. Spatial aliasing of the migration process can be problematic in all three domains: data, operator and image. These three types of spatial aliasing are distinct and independent, although they are often confused.

To begin with, data aliasing occurs when there are seismic frequencies $f$ and dips $\theta$ along reflection and diffraction events in recorded seismic data which violate the following criterion:

$$f \leq f_d = \frac{v_r}{4 \sin \theta_r \Delta x}. \qquad (2)$$

The term $f_d$ is the maximum unaliased frequency in the data for a given trace spacing $\Delta x$, a velocity $v_r$ at the receiver location, and a local plane-wave incident angle $\theta_r$ at the recording surface. Once data have been aliased during the recording process, it is difficult to avoid subsequent processing artifacts except by reshooting the survey at a finer group spacing, or by trying to interpolate the original data without interpolating the aliases (See e.g. Spitz, S., 1991, *Seismic trace interpolation in the F-X domain: Geophysics*, vol. 56, pp. 785-794; or Claerbout, J. F., 1992, *Earth soundings analysis: Processing versus inversion: Blackwell Scientific Publications*).

On the other hand, image aliasing occurs when the output sampling of the image space is too coarse to properly represent migrated dips. In the case of Kirchhoff migration, image aliasing is mostly a cosmetic problem, and can be remedied by choosing an appropriate image mesh upon which to estimate the migrated structural image. Note that the Kirchhoff-migrated values at each mesh point in an aliased image space are uncontaminated and correct (assuming no data or operator aliasing). For example, a single migrated output trace at a well location may be entirely accurate without having to estimate any adjacent migrated traces. This "target-oriented" capability of Kirchhoff migration is not possible with other types of migration methods like spectral or finite-difference. As such, image aliasing is a problem, if the migrated image is needed as input to subsequent multi-channel processing.

Then there is operator aliasing, which occurs when the operator dip along the migration summation trajectory is too steep for a given input seismic trace spacing and frequency content. Spatial aliasing of Kirchhoff integral operators is likely because the operators are designed in the discrete spacetime domain rather than the spectral domain. Great care must be taken to ensure that the $f$-k spectrum of a given space-time operator contains no aliased energy wrapped beyond the Nyquist frequency and wavenumbers. This implies that space-time operators which are spatially undersampled and contain significant steep-dip and high-frequency energy are likely to suffer from severe operator aliasing. In contrast, migration operators designed explicitly in the $f$-k domain are unaliased by definition, and operators designed in the $f$-x domain are easily modified to suppress spatial aliasing.

Conventionally, anti-aliasing operators can be partially accomplished by trace interpolation, aperture control, and operator dip filtering. Trace interpolation decreases the spatial sample interval and thus increases the spatial Nyquist frequency, but at the potentially prohibitive cost of increasing the total 3-D migration input load. Migration aperture-control and operator dip-filtering have the effect of suppressing aliased steep-dip contributions to the output image. Unfortunately, these suppressed steep dips may be precisely the events of interest when imaging near-vertical structure such as salt flanks and faults. A method to anti-alias dip moveout (DMO) operators was then proposed (See Hale, D., 1991, *A nonaliased integral method for dip moveout: Geophysics*, vol. 56, pp. 795-805) by replicating time-shifted versions of the input seismic traces to approximate a summation along an equal-time-sampled version of the operator. This spatial interpolation implied a boxcar averaging, of the input trace values along the time direction, to ensure that both operator aliasing and image aliasing were suppressed, which invoked more lowpass-filtering and loss of resolution than is strictly necessary for the case of migration operator anti-aliasing alone. As such, this replication of time-shifted input traces and spatial interpolations proved to be inefficient from both a floating-point and memory perspective for 3-D migration algorithms, that process thousands of traces simultaneously.

To solve Hale D., supra, conflict it was then proposed (See Gray, S. H., 1992, *Frequency-selective design of the Kirchhoff migration operator: Geophysical Prospecting*, vol. 40, pp. 565-571) an approximate but cost-effective method to anti-alias migration operators. Gray S. H., Id., proposal performed aperture dependent low-pass temporal filtering of the input trace data by having approximately three copies of the input data be lowpass-filtered at different high-cut frequencies. During migration the wide-aperture portions of the migration operator would be drawn increasingly from the lowest-frequency-content filtered trace copies. This corresponded to the notion that the wide-aperture portions of the migration operator have the steepest dips and therefore only the lowest frequencies will be unaliased.

In any way, the operator anti-aliasing criterion is generally set to define the maximum unaliased temporal frequency in the seismic data, at the location that the operator trajectory intercepts a seismic trace, and is a function of the local operator dip and the trace spacing. In order to remain unaliased, the sequence of seismic trace samples summed along the operator trajectory must satisfy the dip Nyquist sampling criterion of:

$$f_{max} \leq \frac{1}{2\Delta T} = \frac{1}{2\left(\frac{\partial t_k}{\partial \rho}\right)\Delta \rho} \qquad (3)$$

The factor $\Delta T$ is the moveout time along the migration operator between adjacent traces. The term $$\frac{\partial t_k}{\partial \rho}$$

is the local spatial derivative of the migration operator trajectory at the point of intersection with the seismic trace, and $\Delta\rho$ is the seismic trace spacing along the recording surface. The anti-aliasing criterion (2) suggests local low-pass filtering of the seismic trace to ensure that frequencies larger than $f_{max}$ are not incorrectly migrated into the output image.

Nonetheless, these existing methods of filtering mostly used for converting from time to depth (or vice versa) occur during the migration process, and they all lead to poor and ambiguous images. As such, the proposed computer-implement method implements a combination of methods that have proved to be more accurate because they not only calculate the complete vector of high-cut frequencies separately for each diffraction trajectory, but also because it is as cost effective by not requiring the memory-intensive storage of multiple data copies to implement the anti-aliasing.

5. Tomography Inversion

Tomography of depth migrated gathers is a method for refining the velocity-depth model. Tomography is based on the principle that if migration is carried out, with a correct velocity depth model, the image gathers should have an event depth equal at all receiving sensors (Tian-wen Lo and Philip Inder Weisen, 1994, *Fundamentals of seismic Tomography*, SEG monograph series). Therefore, tomography attempts to correct errors in the velocity depth model by analyzing the residual delays after PSDM. When prestack depth migration is performed with an initial incorrect velocity model derived from inversion methods based on non-global approaches, the depth gathers will exhibit non-flatness. The degree of non-flatness is a measurement of the error in the model. Tomography uses this measurement of non-flatness (residual moveout analysis) as input and attempts to find an alternative model, which will minimize the errors. The tomographic principle attributes an error in time to an error in both, velocity and depth.

Yet, in the field of inverse theory, an object is described based on measurements or observations that are associated with that object. For industrial-scale applications, there is insufficient data to determine a unique solution and the data obtained may be noisy and/or unreliable. Consequently, an entire branch of mathematics has evolved with attempts to estimate a solution based on the interpretation of inaccurate, insufficient, and inconsistent data. In the case of travel time measurements made in seismic experiment, the inverse problem that is trying to get solved, is the velocity structure of the earth.

When merging the concept of tomography to inversion for multi-dimensional structures, one can observe that it has been utilized in oil field explorations since the late 1970's. However, the resolution for such inversions is typically in kilometers or even tens of kilometers. Details pertaining to the complex systems of oil field explorations cannot be resolved due to thousands of nodes incorporated into the models, so a 3D imaging that is still based on centralized off-line processing and is typically accomplished by multiple active-source recordings where variations over multiple year spans are the main goal. To achieve this, new schemes and methodologies are required to solve the real-time seismic tomography inversion problems, that cannot be achieved using single computational algorithms. This is one motivation for developing a computer-implemented method that can relay of accurate imaging systems and models.

Because tomography is based on ray tracing, it can be formulated for reflection, transmission, and refraction. Several techniques for computing statics corrections in seismic reflection surveys make use of refraction tomography, whilst transmission tomography is used for cross-well applications where both the source and the receiver are inside the medium (within the boreholes); hence there is access to any transmitted arrival information. Exploiting amplitude information in addition to arrival times can further assist ray-based tomography in estimating a reliable velocity model (See for instance, Semtchenok N M, Popov M M, Verdel A R, 2009, *Gaussian beam tomography*, Extended Abstracts, 71st EAGE Conference & Exhibition, Amsterdam, U032). In addition to velocity estimation, tomography can be used to estimate other earth parameters, such as absorption. Further, tomography tries to solve a set of simultaneous equations using many ray-paths traversing the cells in the model. For a common-midpoint (CMP) gather, there are many travel time measurements for a given subsurface reflector element so the travel time expression for these five ray-paths can be written as:

$$T = D * S \quad (4)$$

where T is the total travel time along the ray-path, D is the length of the ray-path in the cell of the velocity, and S is the slowness (i.e., the reciprocal of velocity) also in the cell of the velocity.

Unfortunately, in most cases, the matrix D is not invertible. To be invertible, it needs to be square (i.e., the number of travel time measurements must just happen to be the same as the number of velocity cells in the model) and also needs to satisfy some other criteria. So, instead, the algorithm is then inverted into the time delay and the slowness update resulting in expression:

$$\Delta T = D * \Delta S \quad (5)$$

However, there is a bit of a circular argument in the above description of the method because to estimate the ray-path segment lengths in the cells by ray tracing, a slowness update and the local dip estimates of the reflector segments in each cell are needed. Hence when a method is initiated with forward modelling, by ray tracing using an initial guess of the model, and the associated travel times are computed, the present invention provides the first-guess or estimate model. The tomography must then be iterated to converge on the best estimate of the true model, by minimizing the differences between the observed travel times and those computed by ray tracing for the current guess of the model. Having said that, one skilled in the art would realize that there are other ways of solving for algorithm (2), such as: a direct solver, which is a one-step solution but only suitable for smaller scale problems; or an iterative solver, such as the conjugate gradient method (Scales, J. A., 1987, *Tomographic inversion via the conjugate gradient method*, Geophysics, vol. 52, pp. 179-85), which works well on large-scale systems.

The procedure described so far for tomography inversion, was cast in terms of observed and ray-traced travel times from unmigrated data. Over the past decade however, one skilled in the art has dealt primarily with data and measurements in the depth migrated domain, so there had also been a need to modify the tomography algorithms to account for the change of measurement domain. As such, tomography inversion in the migrated domain can be performed after either prestack time migration (See as an example Pierre Hardy and Jean-Paul Jeannot, 1999, *3-D reflection tomography in time-migrated space*, SEG Technical Program Expanded Abstracts, pp. 1287-1290) or prestack depth migration (e.g., Christof Stork, 1992, *Reflection tomography in the post-migrated domain*, Geophysics vol. 57, pp. 680-692.), yielding a depth model in both cases, with the most widespread industrial practice being to invert using measurements from prestack depth migrated data. When either of these models are used independently, they account for less than useful lithology identification for one skilled in the art.

6. Full Waveform Inversion

Full waveform inversion (FWI) is a non-linear data-fitting procedure that aims at obtaining detailed estimates of subsurface properties from seismic data, which can be the result of either passive or active seismic experiments. Given an initial guess of the subsurface parameters (also referred to as a model), the velocity model, and anisotropy parameter models are predicted by solving a wave-equation. These models are then updated in order to reduce the misfit between the observed and predicted data. This is repeated in an iterative fashion until the data-misfit is sufficiently small.

Mathematically, FWI can be formulated as an optimization problem for M experiments:

$$\min_m \emptyset(m) = \sum_{i=1}^{M} \rho(F_i(m) - d_i); \quad (6)$$

where m represents the model, Ø the phased angle, and ρ(•) is a penalty function. Inside the penalty, $d_i=d_1, \ldots, d_M$ are the observed data and $Fi_i=F_1, \ldots, F_M$ is the corresponding modelling operator for the ith experiment. The optimization problem is typically solved using iterative algorithms of the form:

$$m_{k+1}=m_k+\alpha_k \times s_k; \quad (7)$$

where $s_k$ is called the search direction and $\alpha_k$ is a step-length. The simplest instance is the steepest-descent algorithm, in which case the search direction is given by the negative gradient of the objective:

$$s_k=-\nabla\emptyset(m_k); \quad (8)$$

As observed in the art, all types of waves are involved in the optimization of waves, including diving waves, supercritical reflections, and multi-scattered waves such as multiples. The techniques used for the forward modeling vary and include volumetric methods such as finite-element methods (See Marfurt, K., 1984, *Accuracy of finite-difference and finite-elements modeling of the scalar and elastic wave equation: Geophysics*, vol. 49, pp. 533-549; Min, D.-J., C. Shin, R. G. Pratt, and H. S. Yoo, 2003, *Weighted-averaging finite-element method for 2D elastic wave equations in the frequency domain: Bulletin of the Seismological Society of America*, vol. 93, pp. 904-921.), finite-difference methods (See Virieux, J., 1986, *P-SV wave propagation in heterogeneous media, velocity stress finite difference method: Geophysics*, vol. 51, pp. 889-901), finite-volume methods (Brossier, R., J. Virieux, and S. Operto, 2008, *Parsimonious finite-volume frequency-domain method for 2D P-SV wave modelling: Geophysical Journal International*, vol. 175, pp. 541-559), and pseudo-spectral methods (Danecek, P., and G. Seriani, 2008, *An efficient parallel Chebyshev pseudo-spectral method for large-scale 3D seismic forward modelling*: 70th Conference & Technical Exhibition, EAGE, Extended Abstracts, P046); boundary integral methods such as reflectivity methods (Kennett, B. L. N., 1983, *Seismic wave propagation in stratified media*: Cambridge University Press); generalized screen methods (Wu, R. S., 2003, *Wave propagation, scattering and imaging using dual-domain one-way and one-return propagation: Pure and Applied Geophysics*, vol. 160, pp. 509-539); discrete wavenumber methods (Bouchon, M., M. Campillo, and S. Gaffet, 1989, *A boundary integral equation—Discrete wavenumber representation method to study wave propagation in multilayered media having irregular interfaces: Geophysics*, vol. 54, pp. 1134-1140); generalized ray methods such as WKBJ and Maslov seismograms (Chapman, C., 1985, *Ray theory and its extension: WKBJ and Maslov seismograms: Journal of Geophysics*, vol. 58, pp. 27-43); full-wave theory (de Hoop, A., 1960, *A modification of Cagniard's method for solving seismic pulse problems: Applied Scientific Research*, vol. 8, pp. 349-356); and diffraction theory (Klem-Musatov, K. D., and A. M. Aizenberg, 1985, *Seismic modelling by methods of the theory of edge waves: Journal of Geophysics*, vol. 57, pp. 90-105). Yet, FWI has not been recognized as an efficient seismic imaging technique because pioneering applications were restricted to seismic reflection data. For short-offset acquisition, the seismic wavefield is rather insensitive to intermediate wavelengths; therefore, the optimization cannot adequately reconstruct the true velocity structure through iterative updates. Only when a sufficiently accurate initial model is provided can waveform-fitting converge to the velocity structure through such updates. For sampling the initial model, sophisticated investigations with global and semi-global techniques have been performed (See for instance Koren, Z., K. Mosegaard, E. Landa, P. Thore, and A. Tarantola, 1991, *Monte Carlo estimation and resolution analysis of seismic background velocities: Journal of Geophysical Research*, vol. 96, pp. 20289-20299; or Mosegaard, K., and A. Tarantola, 1995, *Monte Carlo sampling of solutions to inverse problems: Journal of Geophysical Research*, vol. 100, pp. 12431-12447). The rather poor performance of these investigations that arises from insensitivity to intermediate wavelengths has led many researchers to believe that this optimization technique is not particularly efficient.

Only with the benefit of long-offset and transmission data to reconstruct the large and intermediate wavelengths of the structure has FWI reached its maturity (See for instance Mora, P. R., 1987, *Nonlinear two-dimensional elastic inversion of multi-offset seismic data: Geophysics*, vol. 52, pp. 1211-1228; or Pratt R. G. 1999, *Seismic waveform inversion in the frequency domain, Part I: Theory and verification in a physical scale model: Geophysics*, vol. 64, pp. 888-901). FWI attempts to characterize a broad and continuous wavenumber spectrum at each point of the model, reunifying macro-model building and migration tasks into a single procedure. Historical cross-hole and wide-angle surface data examples illustrate the capacity of simultaneous reconstruction of the entire spatial spectrum. However, robust application of FWI to long-offset data remains challenging because of increasing nonlinearities introduced by wavefields propagated over several tens of wavelengths and various incidence angles (Sirgue L. 2006, *The importance of low frequency and large offset in waveform inversion*: 68th Conference & Technical Exhibition, EAGE, Extended Abstracts, A037).

SUMMARY OF THE INVENTION

The present invention discloses a novel method for locating and imaging subsurface reflectors, through the use of a multiple step computer-implement method in different space-domains in order to suppress low wavenumber and low frequency noises, by balancing lateral and vertical amplitudes. This method will produce an image of subsurface reflectors located within a survey area having higher lateral resolutions and wavenumbers, as well as higher high-cut frequencies, and lower low-cut frequencies in complex media, than could otherwise not be achieved by other methods commonly known in the art. As such, a proposed embodiment of the present invention comprises performing a low-pass k-filtering in lateral (x,y) directions only (i.e. not in depth z direction) after performing a 3D Laplacian operation. For depth z direction, a proposed embodiment of the present invention converts it into the time domain, using a provided velocity model, and then performs a low-pass frequency filtering (e.g. f-filtering) at a high-cut frequency of fmax, wherein said value of fmax, is a user pre-defined input parameter. In this way, after utilizing the information from the velocity mode, the image's frequency contents can be exactly contained and kept intact within the range of fmax, for all depth's of acquired seismic image. Thereafter, it is then converted back to depth domain and a final stacked image in 3D space domain directions x, y, and z of the survey region. Said final stacked image is enhanced in lateral resolutions and wavenumbers as well as amplitude balancing, in complex media than any existing method.

Further details, examples and aspects of the invention will be described below referring to the drawings listed in the following.

BRIEF DESCRIPTION OF THE DRAWINGS

The teachings of the present invention can be readily understood by considering the following description in conjunction with the accompanying drawings.

DETAILED DESCRIPTION OF THE INVENTION

Reference will now be made in detail, to several embodiments of the present disclosures, examples of which, are illustrated in the accompanying figures. It is noted that wherever practicable similar or like reference symbols may be used in the figures and may indicate similar or like functionality. The figures depict embodiments of the present disclosure, for purposes of illustration only. One skilled in the art will readily recognize from the following description that alternative embodiments of the structures, systems, and methods illustrated therein may be employed without departing from the principles of the disclosure described herein.

As legacy reverse time migration methods usually perform low-pass k-filtering directly in the depth z direction, and never use any information regarding velocity variations (they implicitly assume that all velocities are constant in all three spatial (x,y,z) directions), these methods are not capable of containing the image's frequency contents within the exact range of a user required frequency variable of fmax anywhere from shallow to deep. As such, these methods require the user to do endless "trial and see" empirical calculations to conclude a proper k-filtering high-cut parameter in z direction. In the end, this may cause that even a person having ordinary skills in the art, could end up damaging the image's spectrum. Thus, the relevancy of the innovative computer-implemented method herewith disclosed.

Figure 1:
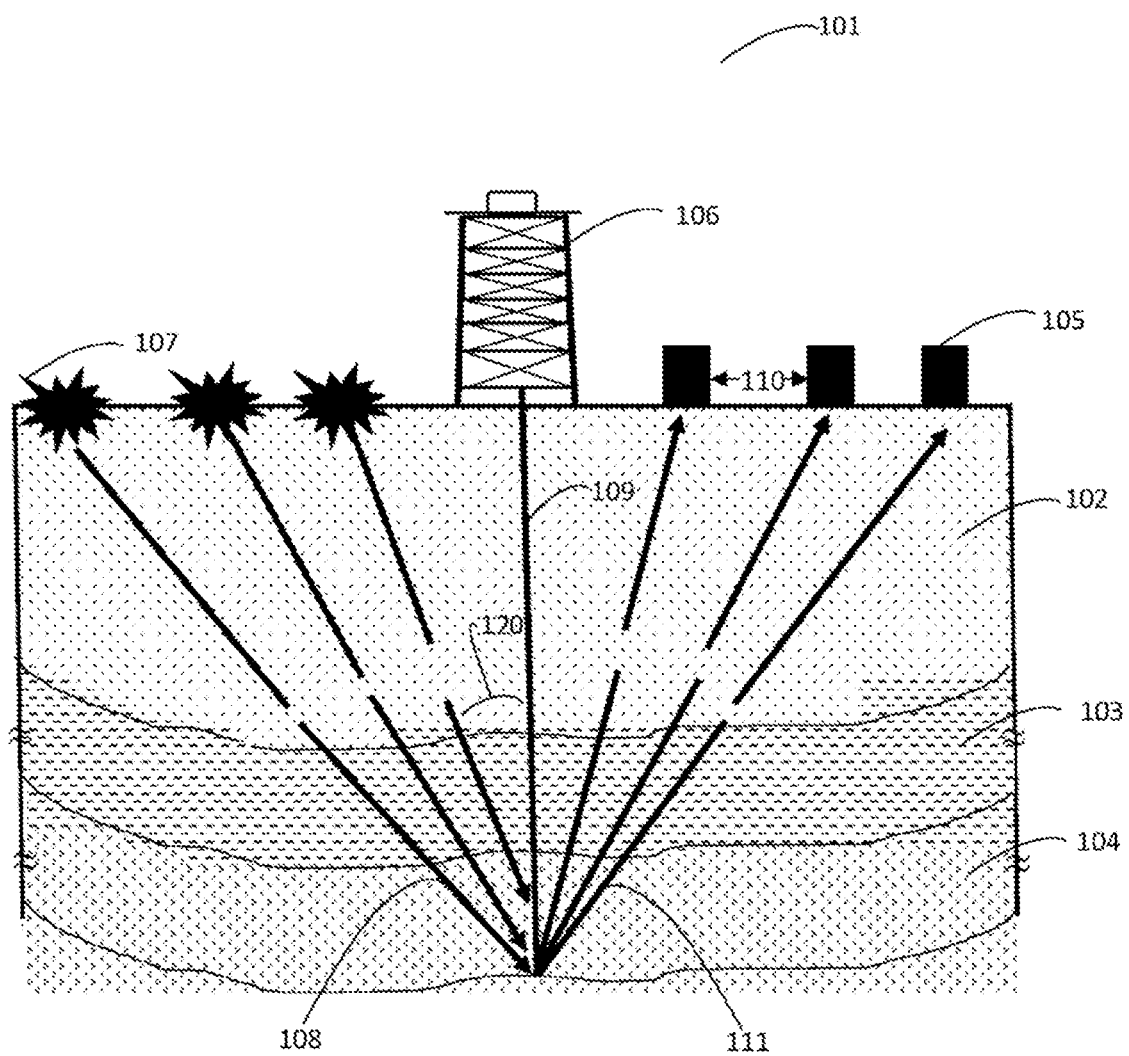
FIG. 1, is a schematic diagram showing a cross-sectional view of an illustrative environment with points of incidence of seismic sources, seismic receivers, a well location, a wellbore, the various transmission rays, and the various angles of incidence, according to certain embodiments of the present disclosure.

FIG. 1 a cross-sectional view of a portion of the earth over the survey region, 101, in which the preferred embodiment of the present invention is useful. It is important to note, that the survey region 101 of FIG. 1 is a land-based region represented as 102. Persons of ordinary skill in the art, will recognize that seismic survey regions produce detailed images of local geology in order to determine the location and size of possible hydrocarbon (oil and gas) reservoirs, and therefore a well location 103. In these survey regions, sound waves bounce off underground rock formations during blasts at various points of incidence 107, and the waves that reflect back to the surface are captured by seismic data recording sensors, 105, the waves being transmitted by data transmission systems, 305, wirelessly, 303, from said sensors, 105, then stored for later processing to a memory resource 304, and processed by a non-transitory computer readable device 306, that is controlled via a computer system device 307 of FIG. 3.

In FIG. 1, the cross-sectional view of a portion of the earth over the survey region illustrates different types of earth formation, 102, 203, 204, which will comprise the seismic survey data in the present invention. In particular, persons having ordinary skill in the art will soon realize that the present example shows a common midpoint-style gather, where seismic data traces are sorted by surface geometry to approximate a single reflection point in the earth. In this example, data from several shots and receivers may be combined into a single image gather, or used individually depending upon the type of analysis to be performed. Although the present example may illustrate a flat reflector and a respective image gather class, other types or classes of image gathers known in the art maybe used, and its selection may depend upon the presence of various earth conditions or events.

Furthermore, as shown on FIG. 1, the seismic energy from the multiple points of incidence or sources 107, will be reflected from the interface between the different earth formations. These reflections will then be captured by multiple seismic data recording receiving sensors 105, each of which will be placed at different location offsets 110 from each other, and the well 103. Because all points of Incidence 107, and all seismic data recording sensors 105 are placed at different offsets 110, the survey seismic data or traces, also known in the art as gathers, will be recorded at various angles of incidence represented by 120. The points of incidence 107 generate downward transmission rays 108, in the earth that are captured by their upward transmission reflection through the recording sensors 105. Well location 103, in this example, is illustrated with an existing drilled well attached to a wellbore, 109, along which multiple measurements are obtained using techniques known in the art. This wellbore 109, is used to obtain source information like wavelets, as well as well log data, that includes P-wave velocity, S-wave velocity, Density, among other seismic data. Other sensors, not depicted in FIG. 1, are placed within the survey region 101 to also capture horizons data information required for interpreters and persons of ordinary skilled in the art to perform various geophysical analysis. In the present example, the gathers will be sorted from field records in order to examine the dependence of amplitude, signal-to-noise, move-out, frequency content, phase, and other seismic attributes, on incidence angles 120, offset measurements 110, azimuth, and other geometric attributes that are important for data processing and imaging, and known by persons having ordinary skills in the art.

Although shots at various points of incidence 107, are represented in FIG. 1 as a common-mid-point shot geometry, with shot lines mostly running horizontally, a person having ordinary skills in the art, would soon realize that said pattern could easily be represented in other ways, such as vertically, diagonally or a combination of the three which would in turn produce a different shot geometry. Nevertheless, because of operating conditions, uniform coverage of receiving sensors 105 for uniform acquisition of wavelets 203, input parameter models 204, and seismic data 205 as shown in FIG. 1, is usually not achievable over the entire survey area.

Figure 2A:
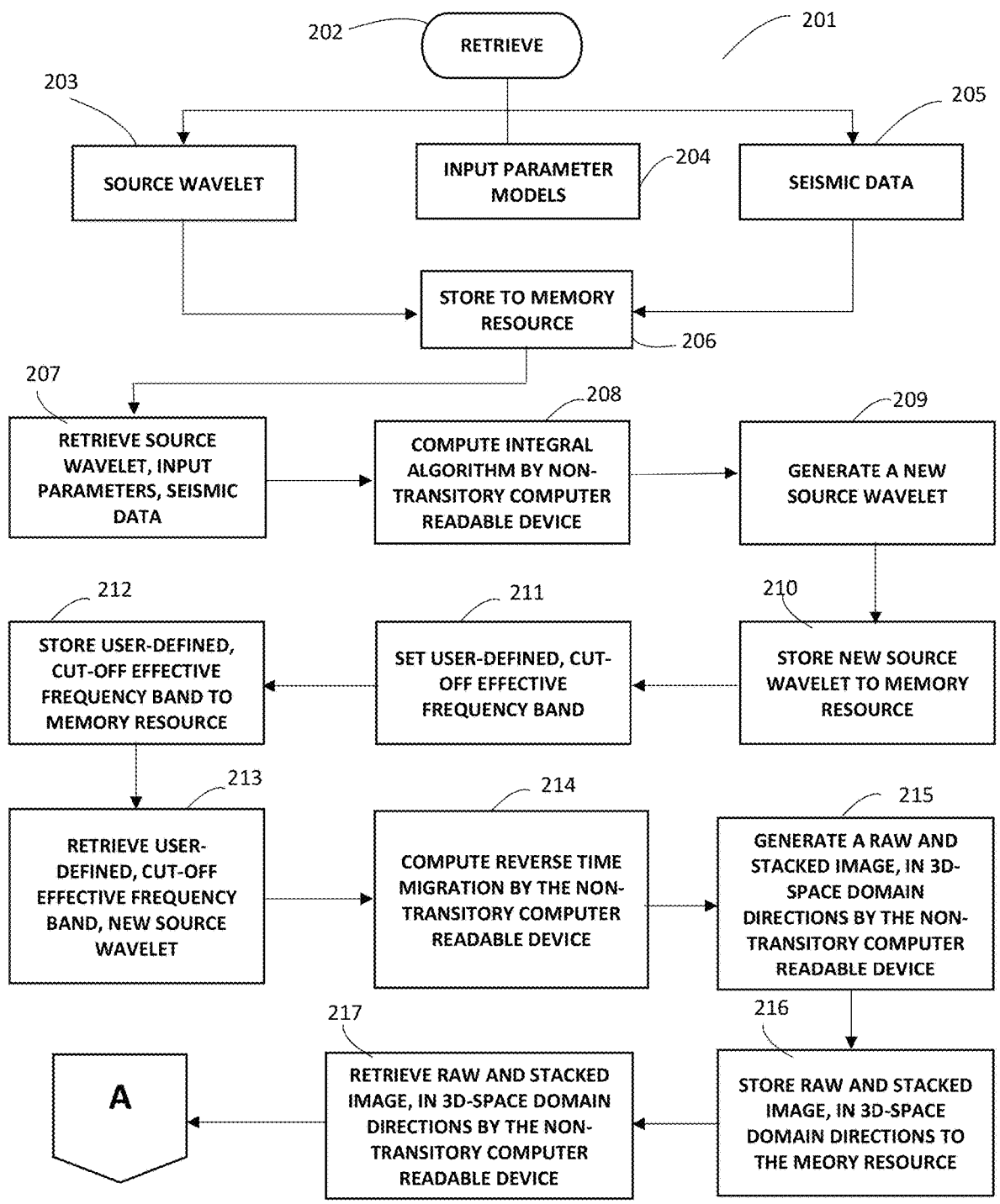
FIG. 2a and FIG. 2b, are a flow chart of the computer-implemented, reverse time migration method, using 3D Laplacian operator, a low-pass wavenumber filtering in 2D-lateral space directions, and a low-pass frequency filtering in 1D-time domain, for removing low frequency and low wavenumber noises to generate an enhanced image, according to certain embodiments of the present disclosure.
Figure 2B:
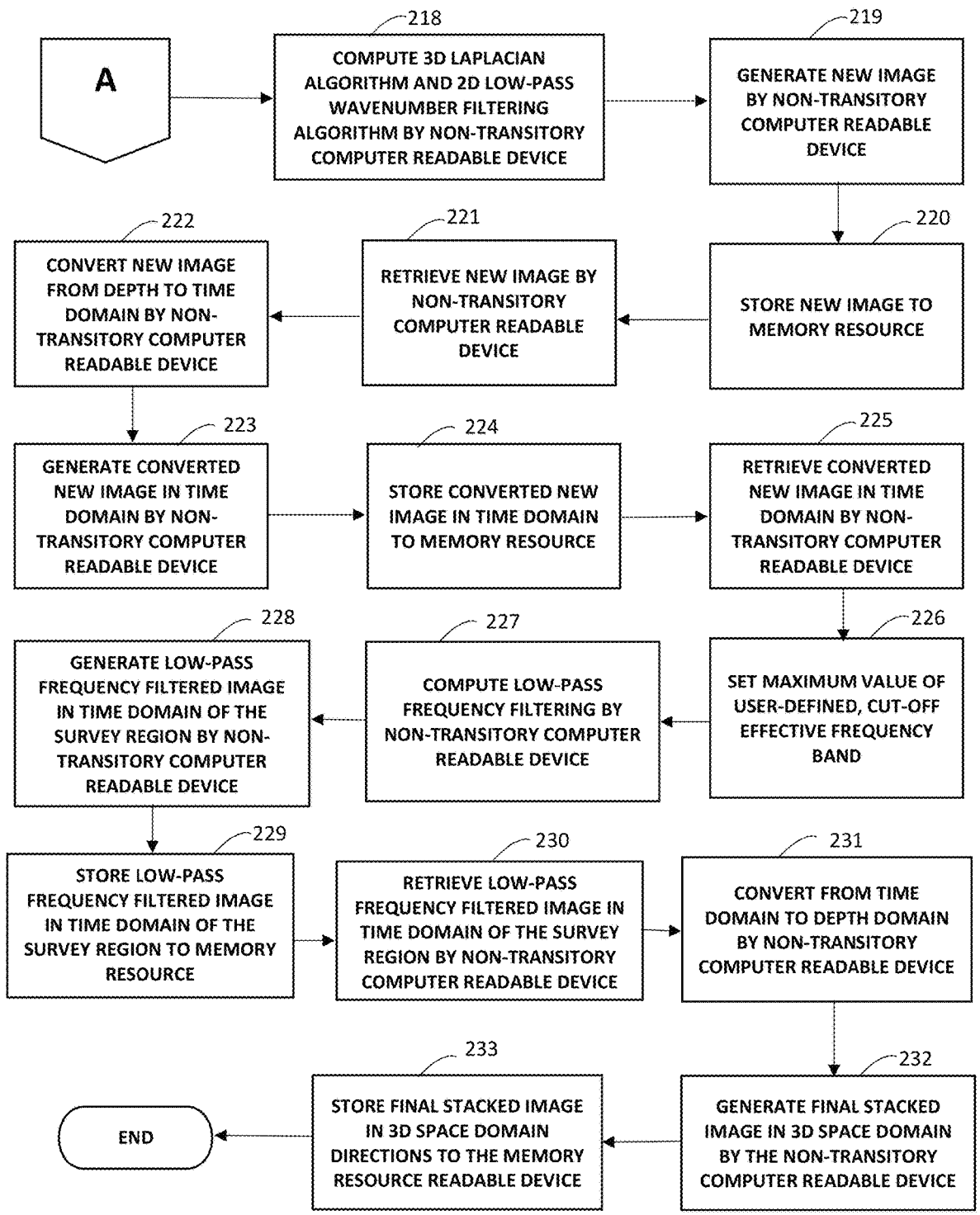

With regards to FIG. 2a and FIG. 2b, they illustrate a flow chart with an overview of the preferred embodiment of the invention. The retrieving phase 202 initiates the process and comprises obtaining and preparing data and information from the survey region. In particular, three different types of inputs are retrieved from the survey region which comprise: 1) a set of wavelets 203 originated from the energy generated at the points of incidence 107; 2) a set of input parameter models 204 further comprising a velocity model in depth interval, as well as an anisotropy parameter models in depth interval, both generated using Tomography Inversion, or Full Waveform Inversion. Persons skilled in the art would soon recognize that these models can an include epsilon model in depth interval, a delta model in depth interval, a dip angle model in depth interval, an azimuthal angle model in depth interval, among others; and 3) seismic data 205 obtained directly from the survey region 101 by the receiving sensors 105, which includes 2D and 3D subsurface structure data such as reflection, shear wave, and refraction. Said retrieving phase 202 is performed by the non-transitory computer readable device 306, and then stored at 206, to the memory resource 304 for later processing and analysis by the digital high-performance computing system of FIG. 3.

The non-transitory computer readable device 306, then receives a message hook to initiate the retrieval process 207 from the memory resource 304 of the data 203, 204, and 205. The non-transitory computer readable device 306, computes at 208 the pre-programmed algorithm of performing the integral computation over the source wavelet 203, using formula:

$$s'(t) = \int_{-\infty}^{t} s(t') dt' \tag{9}$$

This pre-migration processing step 208 is essential to guarantee an undistorted migrated spectrum. This step is not for producing a true amplitude RTM angle gather, but rather related to the Laplacian application of the present embodiment. Upon completion of the algorithm computation, the non-transitory computer readable device 306 generates a new source wavelet at 209, that it is later sent to the memory resource 304 for storage at step 210. Upon successfully storing the new source wavelet 209, the memory resource 304 issues a message hook procedure to the non-transitory computer readable device 306, for the computer system 307 to display through a user-interface, on display 309, a message that indicates to the end user that the system computer, 307, is ready to receive the user-defined cut-off effective frequency band values. At such point, a user of the computer-implement method such as a person having ordinary skills in the art sets at 211 a cut-off effective frequency band value in the range of the effective frequency band of the input data 203, 204, and 205, using a combination of the computer system device inputs such as keyboard 310 and mouse 311. More precisely, said values range from 0 Hz to 250 Hz. Once said values are set, the use will confirm through a message dialog displayed on 309, which will send a message to the non-transitory computer readable device 306, to store at step 212 the set user-defined cut-off effective frequency band to the memory resource 304. The non-transitory computer readable device 306, then retrieves at 213 the set user-defined cut-off effective frequency band, the new source wavelet, the input parameters 204, and the seismic data 205 from the memory resource 304 and begins computing the reverse time migration algorithm at step 214. Upon processing the step of reverse time migration computation 214, the non-transitory computer readable device 306, generates at step 215 a raw and stacked image, in 3D-space domain directions x, y, z of the survey region. Said generated image is then stored at step 216 to the memory resource 304 by the non-transitory computer readable device 306. Upon successfully completing the storage 216, the memory resource 304 messages the non-transitory computer readable device 306 to initiate the retrieval 217 of the stored raw and stacked image from the memory resource 304 for computing a 3D Laplacian algorithm in wavenumber domains x, y, z and a 2D low-pass wavenumber filtering algorithm in lateral wavenumber domains x and y at step 218. The 3D Laplacian algorithm performed at step 218 is defined in programming language in space domain, where P(x,y,z) is the stacked image generated at step 215 comprising of the following formula:

$$\Delta P(x, y, z) = \frac{\partial^2 P}{\partial x^2} + \frac{\partial^2 P}{\partial y^2} + \frac{\partial^2 P}{\partial z^2} \tag{10}$$

Furthermore, at step 218 the algorithm is also programmed to compute the Fast Fourier Transform (FFT) FT[ΔP(x,y,z)] in wavenumber domain as well, using $\tilde{P}(k_x, k_y, k_z)$ instead, which is the Fourier transform of P(x,y,z); and $k_x, k_y, k_z$ are the wavenumbers in x, y, z direction, respectively; represented by the following formula:

$$FT[\Delta P(x,y,z)] = -(k_x^2 + k_y^2 + k_z^2)\tilde{P}(k_x, k_y, k_z) \tag{11}$$

On the other hand, at step 218 the 2D low-pass wavenumber filtering algorithm in space domain (also referred to as k-filtering) is only done in lateral (x,y) directions, unlike other methods in the industry that do it in all directions. The non-transitory computer readable device 306 then at step 219 generates a new image of the survey region in wavenumber domains x, y, z and a 2D low-pass wavenumber filtering algorithm in lateral wavenumber domains x and y, and sends it to the memory resource 304 for storage at step 220. Upon successfully completing the step of storing the new image, the memory resource 304, signals the non-transitory computer readable device 306, to begin the retrieval process of the new image at step 221. With the image already retrieved, the non-transitory computer readable device 306, converts at step 222 the image from depth to time domain using an anti-aliasing operator to a sampling rate in time, and gives the high frequency seismic trace result which can be reached with the given sampling rate. This conversion step 222 takes the depth z direction, and converts it into the time domain using the velocity model from the input parameters 204, and expression:

$$dt \le \frac{1}{2f_{max}} \quad (12)$$

The non-transitory computer readable device 306 then generates at step 223 the converted image in time domain for the depth z direction. The non-transitory computer readable device 306 then stores at step 224 the generated image with depth z direction converted to time domain to the memory resource 304. Upon successfully completing the step 224 of storing the converted image in time domain for the depth z direction, the memory resource 304, signals the non-transitory computer readable device 306, to begin the retrieval process of the converted image in time domain for the depth z direction at step 225. The non-transitory computer readable device 306, then signals to computer system device 307 to display on monitor 309 a programmed graphic user interface that indicates the user, typically a person having ordinary skills in the art, to confirm that the maximum value of the retrieved user-defined, cut-off effective frequency band previously mentioned as a number between the range of 0 Hz and 250 Hz, was set, and proceeds at step 226 to set the maximum value of the retrieved user-defined, cut-off effective frequency band equal to the expression $f_{max}$. The non-transitory computer readable device 306, then initiates the computing of a low-pass frequency filtering at step 227, using the set maximum value of the user-defined, cut-off effective frequency band $f_{max}$ of step 226. In this way, the computer-implemented method utilizes the velocity information, to exactly contain and keep intact, within the set range the image's frequency contents, all the way from the seismic image's shallow to its deepest part. As such, and during step 227 the non-transitory computer readable device 306, automatically realizes the frequency contents' adaptability to the velocity's vertical variations along depth z direction and generates a low-pass frequency filtered image in time domain of the survey region, from the computed low-pass frequency filtering at step 228. The non-transitory computer readable device 306 then stores at step 229 the generated low-pass frequency filtered image in time domain of the survey region to the memory resource 304, and upon successfully completing step 229 of storing the generated low-pass frequency filtered image in time domain of the survey region; the memory resource 304 signals the non-transitory computer readable device 306, to begin the retrieval process of the generated low-pass frequency filtered image in time domain of the survey region at step 230.

With the image already retrieved, the non-transitory computer readable device 306, converts at step 231 the image from time to depth domain using an anti-aliasing operator to the same sampling rate in time used at step 222, and gives the high frequency seismic trace result which can be reached with the given sampling rate. This conversion step 231 takes the depth z direction, and converts it back into the depth domain using the velocity model from the input parameters 204, and the expression:

$$dz \le \frac{v_{min}}{4f_{max}} \quad (13)$$

The non-transitory computer readable device 306 then generates at step 232 a final stacked image in in 3D space domain directions x, y, and z of the survey region. The non-transitory computer readable device 306 then stores at step 232 the final stacked image in in 3D space domain directions x, y, and z of the survey region to the memory resource 304. Upon successful storage of the final stacked image in in 3D space domain directions x, y, and z of the survey region, the memory resource 304 signal the non-transitory computer readable device 306 to display in computer system's 307 display monitor 309 an indication that the computer-implemented, reverse time migration method, using 3D Laplacian operator, a low-pass wavenumber filtering in 2D-lateral space directions, and a low-pass frequency filtering in 1D-time domain, for removing low frequency and low wavenumber noises to generate an enhanced image has been completed.

Figure 3:
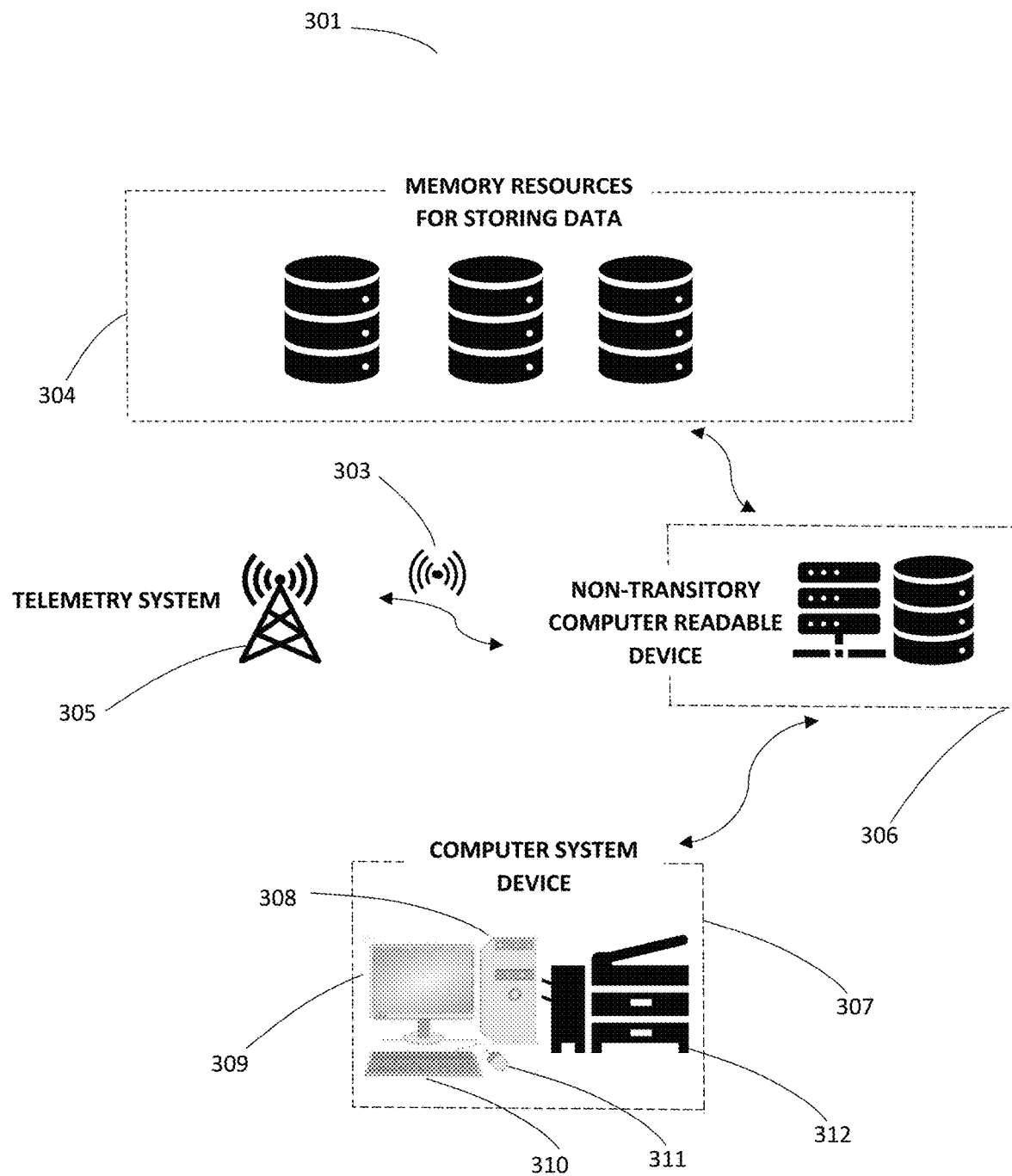
FIG. 3, is an electric diagram, in block form of a digital high-performance computing system programmed to perform the computer-implemented, reverse time migration method, using 3D Laplacian operator, a low-pass wavenumber filtering in 2D-lateral space directions, and a low-pass frequency filtering in 1D-time domain, for removing low frequency and low wavenumber noises to generate an enhanced image, according to certain embodiments of the present disclosure.

As it pertains to FIG. 3, it illustrates a functional block diagram of a digital high-performance computing system programmed to perform the computer-implemented, reverse time migration method, using 3D Laplacian operator, a low-pass wavenumber filtering in 2D-lateral space directions, and a low-pass frequency filtering in 1D-time domain, for removing low frequency and low wavenumber noises to generate an enhanced image, 301. The digital high-performance computing system, 301, further incorporates (wired and/or wirelessly) memory resources, 304, for storing data transmitted from the receiving sensors 105, transmitted wirelessly as represented by 303, using transmission systems, 305, as well as a non-transitory program computer readable device, 306, and a computer system device, 307.

The computer system device, 307, acts as a user interface to the non-transitory program computer readable device, 306; to input, set, select, and perform the operations of retrieving, computing, generating, invoking, determining, converting, and correcting functions (the message hook procedures). Said computer system device, 307, is connected wired and/or wirelessly to the non-transitory program computer readable device 306. The computer system device, 307, further includes other devices like a central processing unit (CPU), 308, a display or monitor, 309, a keyboard, 310, a mouse, 311, and a printer, 312.

The digital high-performance computing system, 301, has firmware, a kernel and a software providing for the connection and interoperability of the multiple connected devices, like the memory resources for storing data, 304, the telemetry system 305, the non-transitory program computer readable memory device, 306, and the computer system device, 307. The digital high-performance computing system, 301, includes an operating system, a set of message hook procedures, and a system application.

Furthermore, because performance is the always important issue, the digital high-performance computing system device, 301, uses the non-transitory program computer readable memory device, 306 to ensure that the beam migration steps will not be bottlenecked by the digital high-performance computing system 301 I/O, or any network communications. In fact, Apache Hadoop distributed filesystem and proper data-compressions, as well as smart file caching according to the data will ensure that the computer-implemented method is only limited by the memory/cache speed and CPU computing power, and nothing else.

The operating system embedded within the digital high-performance computing system 301, may be a Microsoft "WINDOWS" operating system, OS/2 from IBM Corporation, UNIX, LINUX, Sun Microsystems, or Apple operating systems, as well as myriad embedded application operating systems, such as are available from Wind River, Inc.

The message hook procedures of digital high-performance computing system 301 may, for example, represent an operation or command of the memory resources, 304, the computer system device, 307, the non-transitory program computer device, 306, which may be currently executing a certain step, process, or subroutine from the computer-implemented, reverse time migration method, using 3D Laplacian operator, a low-pass wavenumber filtering in 2D-lateral space directions, and a low-pass frequency filtering in 1D-time domain, for removing low frequency and low wavenumber noises to generate an enhanced image.

The set of message hook procedures may be first initiated by an input from: the user, like the entering of user-defined values or parameters; the manipulation of the computer system device, 307; the processing of operations in the non-transitory program computer readable memory device storage, 306; or automatically once certain data has been stored or retrieved by either the memory resources, 304, or the non-transitory program computer readable memory device storage, 306. Based on any of these inputs, processes or manipulation events, the memory resources, 304, the non-transitory program computer readable memory storage device, 306, or the computer system device, 307; generate a data packet that is passed to the digital high-performance computing system, 301, which are indicative of the event that has occurred as well as the event that needs to occur. When digital high-performance computing system, 301, receives the data packet, it converts it into a message based on the event, and executes the required step of the computer-implement method. The computer-implement method includes a set of message hook lists that identifies the series of message hook procedures. When the operating system receives the message, it examines the message hook list to determine if any message hook procedures have registered themselves with the operating system. If at least one message hook procedure has registered itself with the operating system, the operating system passes the message to the registered message hook procedure that appears first on the list. The called message hook executes and returns a value that instructs the digital high-performance computing system, 301, to pass the message to the next registered message hook at either 304, 306 or 307. The digital high-performance computing system, 301, continues executing the operations until all registered message hooks have passed, which indicates the completion of the method by the identification of magnetic inference.

According the preferred embodiment of the present invention, certain hardware, and software descriptions were detailed, merely as example embodiments and are not to limit the structure of implementation of the disclosed embodiments. For example, although many internal, and external components of the receiving system apparatus of FIG. 3 have been described, those with ordinary skills in the art will appreciate that such components and their interconnection are well known. Additionally, certain aspects of the disclosed invention may be embodied in software that is executed using one or more, receiving systems, computers systems devices, or non-transitory computer readable memory devices. Program aspects of the technology may be thought of as "products" or "articles of manufacture" typically in the form of executable code and/or associated data that is carried on, or embodied in, a type of machine readable medium. Tangible non-transitory "storage" type media and devices include any or all memory or other storage for the computers, process or the like, or associated modules thereof such as various semiconductor memories, tape drives, disk drives, optical or magnetic disks, and the like which may provide storage at any time for the software programming.

Figure 4:
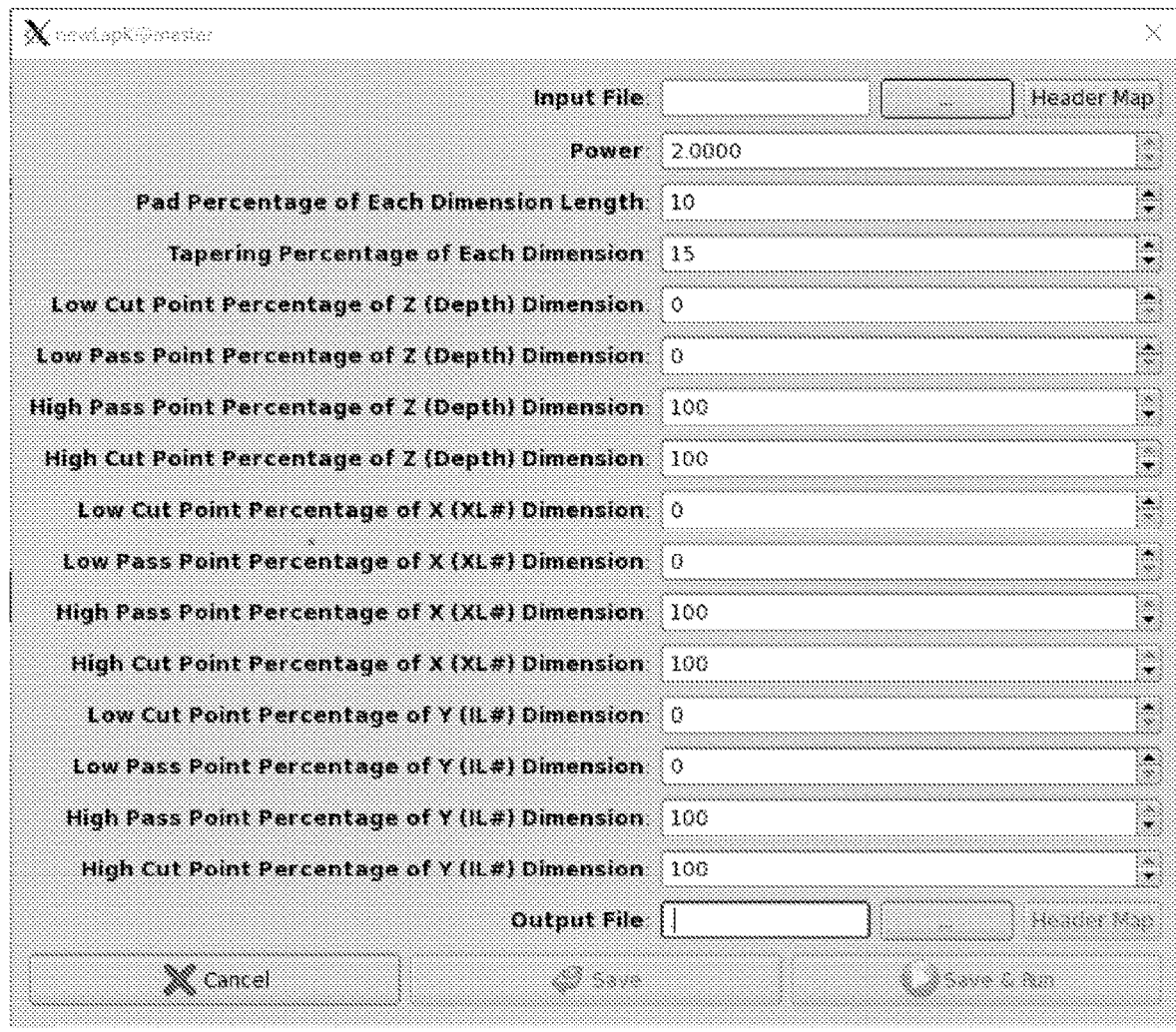
FIG. 4, illustrates a graphic user interface of the computer-implemented, reverse time migration method, according to certain embodiments of the present disclosure.

As it pertains to FIG. 4, it illustrates a graphic user interface of the computer-implemented, reverse time migration method as it is displayed on monitor 309 of the computer system 307 for various of the aforementioned parameters.

As used herein the term "survey region" refers to an area or volume of geologic interest, and may be associated with the geometry, attitude and arrangement of the area or volume at any measurement scale. A region may have characteristics such as folding, faulting, cooling, unloading, and/or fracturing that has occurred therein.

As used herein, the term "computing" encompasses a wide variety of actions, including calculating, determining, processing, deriving, investigation, look ups (e.g. looking up in a table, a database, or another data structure), ascertaining and the like. It may also include receiving (e.g. receiving information), accessing (e.g. accessing data in a memory) and the like. Also, "computing" may include resolving, selecting, choosing, establishing, and the like.

As used herein, "subsurface", and "subterranean" means beneath the top surface of any mass of land at any elevation or over a range of elevations, whether above, below or at sea level, and/or beneath the floor surface of any mass of water, whether above, below or at sea level.

Unless specifically stated otherwise, terms such as "defining", "creating", "including", "representing", "pre-analyzing", "pre-defining", "choosing", "building", "assigning", "creating", "introducing", "eliminating", "re-meshing", "integrating", "discovering", "performing", "predicting", "determining", "inputting", "outputting", "identifying", "analyzing", "using", "assigning", "disturbing", "increasing", "adjusting", "incorporating", "simulating", "decreasing", "distributing", "specifying", "extracting", "displaying", "executing", "implementing", and "managing", or the like, may refer to the action and processes of a retrieving system, or other electronic device, that transforms data represented as physical (electronic, magnetic, or optical) quantities within some electrical device's storage, like memory resources, or non-transitory computer readable memory, into other data similarly represented as physical quantities within the storage, or in transmission or display devices.

Embodiments disclosed herein also relate to computer-implemented system, used as part of the retrieving system for performing the operations herein. This system may be specially constructed for the required purposes, or it may comprise a general-purpose computer selectively activated or reconfigured by a computer program or code stored in the memory resources, or non-transitory computer readable memory. As such, the computer program or code may be stored or encoded in a computer readable medium or implemented over some type of transmission medium. A computer-readable medium includes any medium or mechanism for storing or transmitting information in a form readable by a machine, such as a computer ('machine' and 'computer' may be used synonymously herein). As a non-limiting example, a computer-readable medium may include a computer-readable storage medium (e.g., read only memory ("ROM"), random access memory ("RAM"), magnetic disk storage media, optical storage media, flash memory devices, etc.). A transmission medium may be twisted wire pairs, coaxial cable, optical fiber, or some other suitable wired or wireless transmission medium, for transmitting signals such as electrical, optical, acoustical, or other form of propagated signals (e.g., carrier waves, infrared signals, digital signals, etc.).

A receiving system or sensor 105 as used herein, typically includes at least hardware capable of executing machine readable instructions, as well as the software for executing acts (typically machine-readable instructions) that produce a desired result. In addition, a retrieving system may include hybrids of hardware and software, as well as computer sub-systems.

Hardware generally includes at least processor-capable platforms, such as client-machines (also known as servers), and hand-held processing devices (for example smart phones, personal digital assistants (PDAs), or personal computing devices (PCDs)). Further, hardware may include any physical device that can store machine-readable instructions, such as memory or other data storage devices. Other forms of hardware include hardware sub-systems, including transfer devices such as modems, modem cards, ports, and port cards, for example.

Software includes any machine code stored in any memory medium, such as RAM or ROM, and machine code stored on other devices (such as non-transitory computer readable media like external hard drives, or flash memory, for example). Software may include source or object code, encompassing any set of instructions capable of being executed in a client machine, server machine, remote desktop, or terminal.

Combinations of software and hardware could also be used for providing enhanced functionality and performance for certain embodiments of the disclosed invention. One example is to directly manufacture software functions into a silicon chip. Accordingly, it should be understood that combinations of hardware and software are also included within the definition of a retrieving system and are thus envisioned by the invention as possible equivalent structures and equivalent methods.

Computer-readable mediums or memory resources include passive data storage, such as a random-access memory (RAM) as well as semi-permanent data storage such as external hard drives, and external databases, for example. In addition, an embodiment of the invention may be embodied in the RAM of a computer to transform a standard computer into a new specific computing machine.

Data structures are defined organizations of data that may enable an embodiment of the invention. For example, a data structure may provide an organization of data, or an organization of executable code. Data signals could be carried across non-transitory transmission mediums and stored and transported across various data structures, and, thus, may be used to transport an embodiment of the invention.

The system computer may be designed to work on any specific architecture. For example, the system may be executed on a high-performance computing system, which typically comprise the aggregation of multiple single computers, physically connected, or connected over local area networks, client-server networks, wide area networks, internets, hand-held and other portable and wireless devices, and networks.

An "output device" includes the direct act that causes generating, as well as any indirect act that facilitates generation. Indirect acts include providing software to a user, maintaining a website through which a user is enabled to affect a display, hyperlinking to such a website, or cooperating or partnering with an entity who performs such direct or indirect acts. Thus, a user may operate alone or in cooperation with a third-party vendor to enable the reference signal to be generated on a display device. A display device may be included as an output device, and shall be suitable for displaying the required information, such as without limitation a CRT monitor, an LCD monitor, a plasma device, a flat panel device, or printer. The display device may include a device which has been calibrated through the use of any conventional software intended to be used in evaluating, correcting, and/or improving display results (e.g., a color monitor that has been adjusted using monitor calibration software). Rather than (or in addition to) displaying the reference image on a display device, a method, consistent with the invention, may include providing a reference image to a subject. "Providing a reference image" may include creating or distributing the reference image to the subject by physical, telephonic, or electronic delivery, providing access over a network to the reference, or creating or distributing software to the subject configured to run on the subject's workstation or computer including the reference image. In one example, providing of the reference image could involve enabling the subject to obtain the reference image in hard copy form via a printer. For example, information, software, and/or instructions could be transmitted (e.g., electronically or physically via a data storage device or hard copy) and/or otherwise made available (e.g., via a network) in order to facilitate the subject using a printer to print a hard copy form of reference image. In such an example, the printer may be a printer which has been calibrated through the use of any conventional software intended to be used in evaluating, correcting, and/or improving printing results (e.g., a color printer that has been adjusted using color correction software).

A database, or multiple databases may comprise any standard or proprietary database software, such as Oracle, Microsoft Access, SyBase, or DBase II, for example. The database may have fields, records, data, and other database elements that may be associated through database specific software. Additionally, data may be mapped. Mapping is the process of associating one data entry with another data entry. For example, the data contained in the location of a character file can be mapped to a field in a second table. The physical location of the database is not limiting, and the database may be distributed. For example, the database may exist remotely from the server, and run on a separate platform. Further, the database may be accessible across a local network, a wireless network of the Internet.

Furthermore, modules, features, attributes, methodologies, and other aspects can be implemented as software, hardware, firmware, or any combination thereof. Wherever a component of the invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the invention is not limited to implementation in any specific operating system or environment.

Various terms as used herein are defined below. To the extent a term used in a claim is not defined below, it should be given the broadest possible definition persons in the pertinent art have given that term as reflected in at least one printed publication or issued patent.

As used herein, "and/or" placed between a first entity and a second entity means one of (1) the first entity, (2) the second entity, and (3) the first entity and the second entity. Multiple elements listed with "and/or" should be construed in the same fashion, i.e., "one or more" of the elements so conjoined.

Additionally, the flowcharts and block diagrams in the Figures illustrate the architecture, functionality, and operation of possible implementations of systems, methods, and computer program products according to various embodiments of the present disclosure. It should also be noted that, in some alternative implementations, the functions noted in the block may occur out of the order noted in the Figures. For examples, two blocks shown in succession may, in fact, be executed substantially concurrently, or the blocks may sometimes be executed in the reverse order, depending upon the functionality involved. It will also be noted that each block of the block diagrams and/or flowcharts illustration, and combinations of blocks in the block diagrams and/or flowchart illustration, can be implemented by special purpose hardware-based systems that perform the specified hardware functions or acts, or combinations of special purpose hardware and computer instructions.

While in the foregoing specification this disclosure has been described in relation to certain preferred embodiments thereof, and many details have been set forth for purpose of illustration, the invention is not to be unduly limited to the foregoing which has been set forth for illustrative purposes. On the contrary, a wide variety of modifications and alternative embodiments will be apparent to a person skilled in the art, without departing from the true scope of the invention, as defined in the claims set forth below. Additionally, it should be appreciated that structural features or method steps shown or described in any one embodiment herein can be used in other embodiments as well.

What I claimed is:

1. A computer-implemented, reverse time migration method, pre-programmed on a non-transitory computer readable device coupled to a memory resource configured to execute the computer-implemented, reverse time migration method using a 3D Laplacian operator, a low-pass wavenumber filtering in 2D-lateral space directions, and a low-pass frequency filtering in a 1D-time domain, for removing low frequency and low wavenumber noises to generate a final stacked image in a 3D space domain in x, y, and z directions of a survey region, the method comprising:

retrieving a source wavelet, a set of input parameter models, and seismic data from receiving sensors of the survey region having the 3D space domain in the x, y, and z directions by the non-transitory computer readable device using a telemetry device;

storing the source wavelet, the set of input parameter models, and the seismic data from the survey region to the memory resource;

retrieving the source wavelet, the set of input parameter models, and the seismic data from the memory resource by the non-transitory computer readable device;

computing an integral algorithm by the non-transitory computer readable device using the source wavelet retrieved from the memory resource;

generating a new source wavelet from the integral algorithm by the non-transitory computer readable device;

storing the new source wavelet to the memory resource by the non-transitory computer readable device;

setting a user-defined, cut-off effective frequency band, for the seismic data on the non-transitory computer readable device;

storing the user-defined, cut-off effective frequency band to the memory resource by the non-transitory computer readable device;

retrieving the user-defined, cut-off effective frequency band, the new source wavelet, the set of input parameter models, and the seismic data, from the memory resource by the non-transitory computer readable memory device;

computing a reverse time migration by the non-transitory computer readable device using the user-defined, cut-off effective frequency band, the new source wavelet, the set of input parameter models, and the seismic data;

generating a raw and stacked image, in the 3D space domain in the x, y, and z directions of the survey region by the non-transitory computer readable device from the reverse time migration;

storing the raw and stacked image, in the 3D space domain in the x, y, and z directions of the survey region, to the memory resource by the non-transitory computer readable device;

retrieving the raw and stacked image from the memory resource by the non-transitory computer readable device;

computing a 3D Laplacian algorithm in wavenumber domains in the x, y, and z directions and a 2D low-pass wavenumber filtering algorithm in lateral wavenumber domains in the x and y directions, by the non-transitory computer readable device using the raw and stacked image;

generating a new image of the survey region, by the non-transitory computer readable device from the 3D Laplacian algorithm in the wavenumber domains in the x, y, and z directions and the 2D low-pass wavenumber filtering algorithm in the lateral wavenumber domains in the x and y directions;

storing the new image of the survey region, to the memory resource by the non-transitory computer readable device;

retrieving the new image of the survey region, from the memory resource by the non-transitory computer readable device;

converting the new image of the survey region, from a depth domain to a time domain, using the set of input parameter models, and an anti-aliasing filter in the time domain, by the non-transitory computer readable device;

generating a depth to time converted image in the time domain of the survey region, by the non-transitory computer readable device;

storing the depth to time converted image in the time domain of the survey region to the memory resource by the non-transitory computer readable device;

retrieving the depth to time converted image in the time domain of the survey region from the memory resource, by the non-transitory computer readable resource;

setting a maximum value of the user-defined, cut-off effective frequency band to an expression $f_{max}$ by the non-transitory computer readable device;

computing the low-pass frequency filtering of the depth to time converted image in the time domain of the survey region, using the maximum value of the user-defined, cut-off effective frequency band $f_{max}$ by the non-transitory computer readable device;

generating a low-pass frequency filtered image in the time domain of the survey region, from the low-pass frequency filtering by the non-transitory computer readable device;

storing the low-pass frequency filtered image in the time domain of the survey region, to the memory resource by the non-transitory computer readable device;

retrieving the low-pass frequency filtered image in the time domain of the survey region from the memory resource, by the non-transitory computer readable device;

converting the low-pass frequency filtered image in the time domain of the survey region from the time domain to the depth domain, using the set of input parameter models, and an anti-aliasing filter in the z direction of the survey region, by the non-transitory computer readable device;

generating the final stacked image in the 3D space domain in the x, y, and z directions of the survey region, by the non-transitory computer readable device;

storing the final stacked image in the 3D space domain in the x, y, and z directions of the survey region, to the memory resource, by the non-transitory computer readable device; and outputting the final stacked image in the 3D space domain in the x, y, and z directions of the survey region, to a display on a computer system device.

2. The computer-implemented, reverse time migration method of claim 1, wherein the set of input parameter models from the step of retrieving the source wavelet, the set of input parameter models, and the seismic data from the receiving sensors of the survey region having the 3D space domain in the x, y, and z directions by the non-transitory computer readable device using the telemetry device, further comprises a velocity model in a depth interval, and anisotropy parameter models in the depth interval generated using Tomography Inversion, or Full Waveform Inversion.

3. The computer-implemented, reverse time migration method of claim 2, wherein the step of converting the low-pass frequency filtered image in the time domain of the survey region from the time domain to the depth domain, using the set of input parameter models, and the anti-aliasing filter in the z direction of the survey region, by the non-transitory computer readable device, further comprises a checking depth step:

$$dz \leq \frac{v_{min}}{4f_{max}},$$

wherein $f_{max}$ represents the maximum value of the user-defined, cut-off effective frequency band, and $V_{min}$ is a minimum velocity in the velocity model.

4. The computer-implemented, reverse time migration method of claim 1, wherein the non-transitory computer readable device is further attached to the computer system device, for outputting to the display or a printing device the storing steps.

5. The computer-implemented, reverse time migration method of claim 1, wherein the step of computing the integral algorithm by the non-transitory computer readable device using the source wavelet retrieved from the memory resource further comprises an expression: $s'(t)=\int_{-\infty}^{t} s(t')dt'$, wherein $s(t')$ represents the source wavelet.

6. The computer-implemented, reverse time migration method of claim 1, wherein the step of setting the user-defined, cut-off effective frequency band for the seismic data on the non-transitory computer readable device, further comprises the user-defined, cut-off effective frequency band between the values of 0 Hz and 250 Hz.

7. The computer-implemented, reverse time migration method of claim 1, wherein the step of generating the raw and stacked image, in the 3D space domain in the x, y, and z directions of the survey region by the non-transitory computer readable device from the reverse time migration, further comprises an expression: P(x,y,z), which represents the raw and stacked image.

8. The computer-implemented, reverse time migration method of claim 1, wherein the step of computing the 3D Laplacian algorithm in the wavenumber domains in the x, y, and z directions, and the 2D low-pass wavenumber filtering algorithm in the lateral wavenumber domains in the x and y directions, by the non-transitory computer readable device using the raw and stacked image, further comprises an expression:

$$FT[-\Delta P(x,y,z)] = (k_x^2 + k_y^2 + k_z^2)\tilde{P}(k_x, k_y, k_z),$$

wherein $FT[-\Delta P(x,y,z)]$ represents a 3D Fast Fourier Transform in the wavenumber domains of a negative Laplacian operation of the raw and stacked image $P(x,y,z)$, $\tilde{P}(k_x, k_y, k_z)$ represents a 3D Fourier Transform of $P(x,y,z)$, and $k_x, k_y, k_z$ correspond to wavenumbers in the x, y and z directions, respectively.

9. The computer-implemented, reverse time migration method of claim 1, wherein the step of converting the new image of the survey region, from the depth domain to the time domain, using the set of input parameter models, and the anti-aliasing filter in the time domain, by the non-transitory computer readable device, further comprises a checking time step:

$$dt \leq \frac{1}{2f_{max}},$$

wherein $f_{max}$ represents the maximum value of the user-defined, cut-off effective frequency band.

* * * * *